（12) United States Patent
Huang et al.

(10) Patent No.: US 12,519,812 B2
(45) Date of Patent: Jan. 6, 2026

(54) MULTI-PERSPECTIVE USER AND ENTITY BEHAVIOR ANALYTICS FOR SOFTWARE-AS-A-SERVICE APPLICATIONS

(71) Applicant: Palo Alto Networks, Inc., Santa Clara, CA (US)

(72) Inventors: Shan Huang, San Jose, CA (US); William Redington Hewlett, II, Mountain View, CA (US); Manish Mradul, Milpitas, CA (US); Sujit Rokka Chhetri, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 153 days.

(21) Appl. No.: 18/340,432

(22) Filed: Jun. 23, 2023

(65) Prior Publication Data
US 2024/0430279 A1    Dec. 26, 2024

(51) Int. Cl.
*H04L 9/40*       (2022.01)
*H04L 41/16*     (2022.01)

(52) U.S. Cl.
CPC .......... *H04L 63/1425* (2013.01); *H04L 41/16* (2013.01); *H04L 63/105* (2013.01)

(58) Field of Classification Search
CPC ... H04L 63/1425; H04L 41/16; H04L 63/105; H04L 67/535; G06N 3/045; G06N 3/047; G06N 3/08; G06N 5/022; G06N 7/01
See application file for complete search history.

(56) References Cited

U.S. PATENT DOCUMENTS

| 9,609,009 | B2 | 3/2017 | Muddu et al. |
| 2017/0063889 | A1 | 3/2017 | Muddu et al. |
| 2020/0336502 | A1* | 10/2020 | Xu .......................... G06N 3/02 |
| 2022/0164423 | A1 | 5/2022 | Callegari et al. |

FOREIGN PATENT DOCUMENTS

WO    2020219134 A2    10/2020

OTHER PUBLICATIONS

PCT Application No. PCT/US2024/034491, International Search Report and Written Opinion mailed Sep. 20, 2024, 15 pages.
"What is User and Entity Behavior Analytics (UEBA)?", [online], [retrieved on Jan. 23, 2023] Retrieved from the Internet: <https://www.paloaltonetworks.com/cyberpedia/what-is-ueba>.

* cited by examiner

*Primary Examiner* — El Hadji M Sall
(74) *Attorney, Agent, or Firm* — Gilliam IP PLLC

(57) ABSTRACT

A multi-perspective user and entity behavior analytics (UEBA) system ("system") builds and maintains interchangeable modules for predicting likelihoods of anomalous user behavior at the scope of an actor (i.e., a user or entity) of an organization within time periods. Each module comprises probability models and/or machine learning models as sub-modules that model actor behavior at various levels of granularity with respect to usage of Software-as-a-Service applications. The system generates anomalousness scores by decorrelating likelihoods output by each sub-module and uses the anomalousness scores to monitor and perform corrective action based on anomalous actor behavior to maintain security posture across the organization.

23 Claims, 9 Drawing Sheets

MULTI-PERSPECTIVE USER AND ENTITY BEHAVIOR ANALYTICS FOR SOFTWARE-AS-A-SERVICE APPLICATIONS

BACKGROUND

The disclosure generally relates to data processing (e.g., CPC subclass G06F) and to computing arrangements based on specific computational models (e.g., CPC subclass G06N).

User behavior analytics (UBA) or user and entity behavior analytics (UEBA) is a cybersecurity technique for tracking user/entity analytics over a network (e.g., at servers, network devices, endpoint devices, etc.) to detect anomalies that potentially relate to threats or exposure of a cybersecurity system. Data reflective of user/entity activities in a network are collected periodically, such as from a variety of sources of log data. Statistical analysis, machine learning, or other analytics techniques are applied to the collected data to determine normal behavior patterns (e.g., in terms of user activities and usage of devices reflected in the data) among users and entities. Collection of such data is ongoing for periodic analysis based on the established normal behavior patterns to determine if the behaviors of any users/entities reflected in the collected data is deviant or anomalous. Users and/or entities determined to correspond to data representing a deviation from the normal behavior pattern can be detected as potentially being related to a threat or otherwise posing a risk to the network.

BRIEF DESCRIPTION OF THE DRAWINGS

Embodiments of the disclosure may be better understood by referencing the accompanying drawings.

DESCRIPTION

Figure 1:
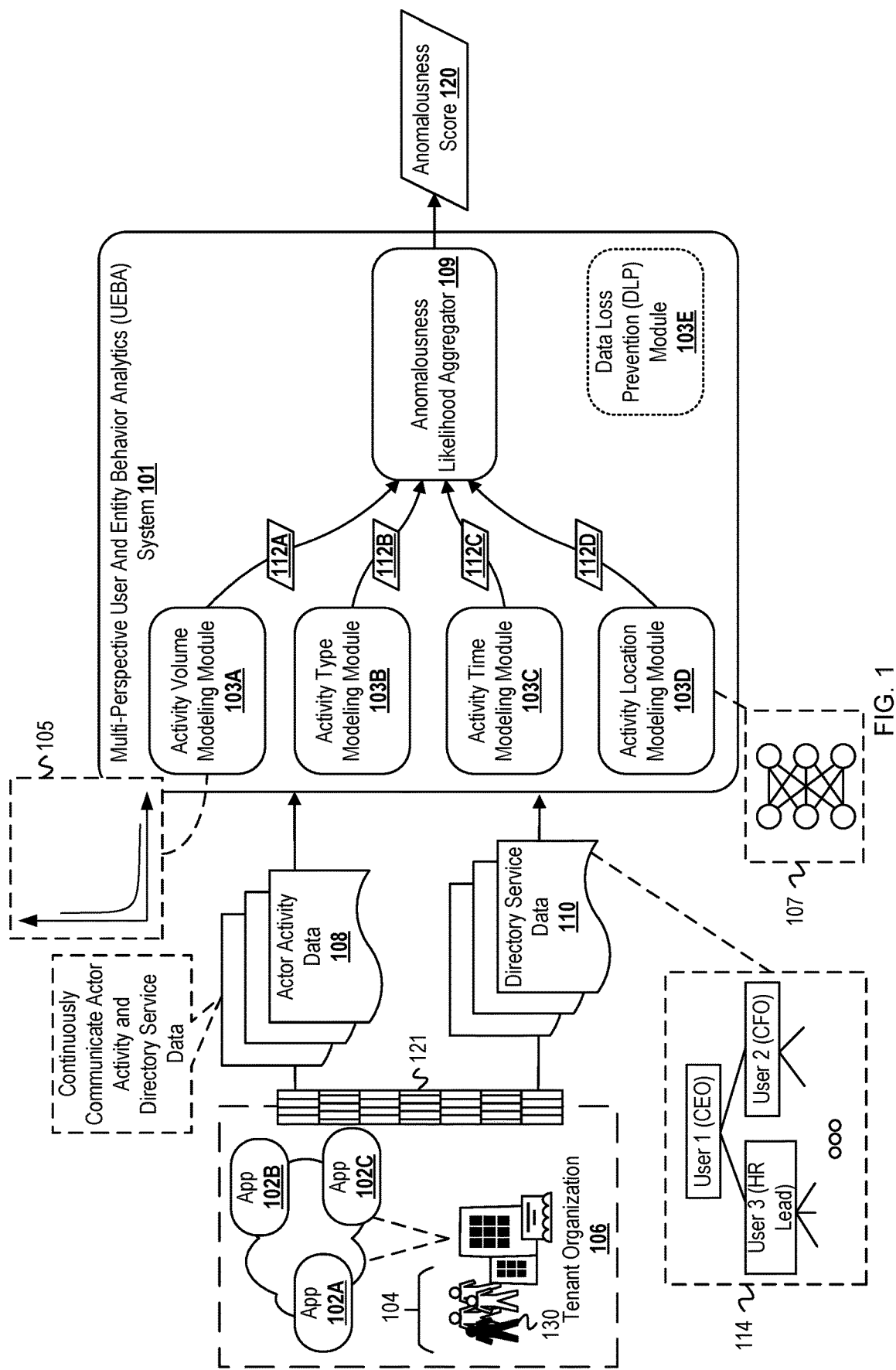
FIG. 1 is a conceptual diagram of an example multi-perspective UEBA system for generating anomalousness scores for actor behavior in a tenant organization with multiple modules.

The description that follows includes example systems, methods, techniques, and program flows to aid in understanding the disclosure and not to limit claim scope. Well-known instruction instances, protocols, structures, and techniques have not been shown in detail for conciseness.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

An "actor" as used herein refers to a user or entity under the umbrella of an organization, wherein the organization subscribes to one or more Software-as-a-Service applications (SaaS applications) as a tenant. Actors have associated historical activity data for the one or more SaaS applications.

Overview

Implementing UEBA, particularly for applications delivered according to the SaaS model poses several challenges due to the inherent variability of actor behavior both within and across tenant organizations. Additionally, data within the scope of individual actors for a tenant organization are typically sparse and consequently it is difficult to train effective models that capture actor-specific behavior. Modeling different aspects of actor behavior to improve quality of UEBA implementations and account for variability of actor behavior is particularly challenging when data for the model scope is sparse.

Disclosed herein is a multi-perspective UEBA system that effectively models behavior of actors by leveraging SaaS activity data both from the actor and nearby actors according to a directory service of a tenant organization of SaaS applications utilized by the actor. Each perspective from which the data are analyzed corresponds to a different aspect of behavior, where an "aspect" of an actor's behavior refers to a descriptor of behavior that can be discerned from data indicating activities of actors within SaaS applications of the tenant organization. Exemplary aspects of behavior include activity volume (e.g., amounts of data uploaded/downloaded), activity time, activity type, and locations associated with actor activity. Each aspect of behavior is modelled by a distinct module that implements machine learning and/or statistical techniques both for an actor and, when insufficient data is present, across multiple actors of the tenant organization. The modules are continuously trained on previous time periods of actor behavior and simultaneously used to predict anomalies in actor behavior at a current time period. Based on behavioral data collected at the current time period, the multi-perspective UEBA system decorrelates and combines likelihoods obtained as outputs from inputting a subset of the behavior data into each module to generate an anomalousness score for the actor, wherein each likelihood indicates a probability that the actor's behavior in the current time period is anomalous.

Each module implemented by the multi-perspective UEBA system potentially uses data from additional actors of the tenant organization for training. For instance, for modules capturing activity volume, activity time, and activity type aspects of actor behavior, the multi-perspective UEBA system can determine that data for the actor in the previous time periods is insufficient (i.e., too sparse) and can retrieve data for nearby actors in a hierarchical structure defined by a directory service of the tenant organization as additional data for training each module. For a module capturing the locations associated with actor activity, the multi-perspective UEBA system can collect location-based data for actors across the entire tenant organization as training data. The scores are generated as simple weighted averages from likelihoods output by each module. As a result, this framework is flexible by enabling dynamic addition and removal of modules with minimal effect on scoring and enabling dynamic addition of training data for modules having sparse actor activity over previous time periods.

Example Illustrations

FIG. 1 is a conceptual diagram of an example multi-perspective UEBA system for generating anomalousness scores for actor behavior in a tenant organization with multiple modules. A multi-perspective UEBA system ("system") 101 manages UEBA for a tenant organization 106 subscribed at least to SaaS applications 102A-102C. The system 101 comprises modules 103A-103D that generate likelihoods 112A-112D, respectively, that actor behavior for a target actor 130 among actors 104 of the tenant organization 106 is anomalous over a time period. The likelihoods 112A-112D are then aggregated by an anomalousness likelihood aggregator 109 to generate an anomalousness score 120 that behavior of the target actor 130 is anomalous in the time period. As a facet of implementing UEBA, the tenant organization 106 continuously communicates actor activity data 108 and directory service data 110 to the system 101 for online anomaly detection over shifting time periods of data collection and updating of the modules 103A-103D. Although depicted as comprising modules 103A-103D representing various aspects of actor behavior, the system 101 is flexible and can dynamically add or remove modules by reconfiguring the anomalousness likelihood aggregator 109 to accept different inputs. For instance, a data loss prevention (DLP) module 103E is depicted with a dashed outline to indicate that this module can be dynamically added or removed by the system 101. Each module models a distinct perspective of activity by the actor 130 within bucketed time windows of time periods, where each time period comprises a period for analysis of anomalous behavior by the actor 130. While the time periods and bucketed time windows within each time period can vary in granularity, for simplicity each time period and bucketed time window is described as a day and each hour in a day, respectively.

The tenant organization 106 comprises an organization with a subscription to multiple SaaS applications 102A-102C. The tenant organization 106 can be distributed across multiple locations and many data stores or networks of the tenant organization 106 which can be on-premise or cloud-based private networks. Accordingly, a firewall 121 collects actor data from various communications channels and databases across the tenant organization 106 (for instance, at a data lake in the cloud) and periodically communicates actor activity data 108 and directory service data 110 in batches to the system 101. The firewall 121 can sort the communicated data 108, 110 by application identifier, for instance from process identifiers indicated in traffic logs. Communication of the actor activity data 108 and the directory service data 110 occurs asynchronously. For instance, the firewall 121 can communicate the actor activity data 108 for every time period for which actor activity is being monitored, whereas the firewall 121 can communicate the directory service data 110 as updates occur or according to a prolonged schedule over multiple time periods. Although the firewall 121 and system 101 are depicted as distinct software components in FIG. 1, the system 101 can be a subcomponent of the firewall 121 and can share memory with various other components that collect data for the purposes of UEBA, avoiding the step of communicating the data 108, 110 to the system 101.

Activity volume modeling module 103A models actor activity for the actor 130 over bucketed time windows (e.g., every hour) within a time period (e.g., a day). Actor activity comprises events for the actor 130 related to the SaaS applications 102A-102C. An "event" refers to an action taken by the actor 130 that interacts with one of the SaaS applications 102A-102C, for instance by initializing or altering a process, by prompting communication of data across a public or private network, by clicking through elements of a user interface, by initializing downloads or uploads via an application, etc. The activity volume modeling module 103A comprises sub-modules that are probability distributions (e.g., example probability distribution 105) that model frequency of events for the actor 130 within each of the bucketed time windows based on historical activity data for the actor 130. Each probability distribution models a particular action by the actor 130 when using one of the SaaS applications 102A-102C during a bucketed time window. For instance, a probability distribution can model downloads by the actor 103 for application 102A between 9 am and 10 am, uploads by the actor 130 for application 102B between 1 pm and 2 pm, etc.

Each probability distribution is chosen from a family of probability distributions such as a power law distribution, and the parameters from the family of probability distributions are chosen to minimize the difference between the probability distribution and the historical data, for instance using maximum likelihood estimation (i.e., the probability distribution is "fitted" to the historical activity data). Other families of probability distributions such as Gaussian distributions and log-normal distributions can be fitted to the historical data. The family of probability distributions is chosen based on expected shape of historical actor activity data. For instance, in the case of a family of power law distributions, the activity volume modeling module 103A models the distributions of frequency of events in bucketed time windows for the actor 130. In this instance, the sorted frequencies within bucketed time windows are expected to have the shape of a power law distribution. For other aspects of actor behavior that have different expected shapes, other families of probability distributions can be used.

The activity volume modeling module 103A then computes the likelihoods 112A by determining a feature value corresponding to each probability distribution (e.g., number of downloads by the actor 130 for application 112A between 9 am and 10 am) from the actor activity data 108 over a current time period for analysis and retrieves the anomalousness likelihood value given by the probability distribution for that feature value (e.g., between 1 and 2 downloads by the actor 130 for application 112A between 9 am and 10 am has likelihood 0.5 of corresponding to anomalous behavior).

Activity type modeling module 103B and activity time modeling module 103C also use probability distributions to model actor behavior based on the actor activity data 108. The activity type modeling module 103B comprises probability distributions corresponding to each application/activity type pair and each bucketed time window (e.g., each hour in a day) for applications 102A-102C and types of activities by the actor 130. The activity time modeling module 103C comprises a probability distribution for each bucketed time window that models how often the actor 130 performs an activity within each bucketed time window from the actor activity data 108.

The activity location modeling module 103D models historical locations of actors across the tenant organization 106 within each bucketed time window. For instance, the activity location modeling module 103D can comprise a neural network such as example neural network 107. The activity location modeling module 103D takes as inputs both locations identified in actor activity by the actor 130 in the time period as well as metadata and proximity data for nearby actors according to a hierarchical structure defined in the directory service data 110. The likelihood 112D comprises a final layer output of the activity location modeling module 103D. While modules 103A-103C are trained per-actor, the activity location modeling module 103D is trained on actor data across the tenant organization 106. Additional details for architecture of the activity location modeling module 103D are described in FIG. 3.

The DLP module 103E models frequency of the actor 130 accessing potentially sensitive documents, e.g., documents classified as potentially sensitive according to a DLP system managed by the firewall 121 (not depicted). The DLP module 103E comprises probability distributions for each bucketed time window modeling the number of potentially sensitive documents accessed by the actor 130 from the actor activity data 108.

Any of the modules 103A-103C can suffer from sparsity of data within a time window for prediction of likelihoods of anomalous behavior by the actor 130. To account for this sparsity, the system 101 can determine whether there is insufficient data in the actor activity data 108 for each of the modules 103A-103C and, based on determining that one or more of the modules 103A-103C have insufficient data, can determine the N closest actors to the actor 130 according to a hierarchical structure of the tenant organization 106 defined in the directory service data 110. N is a parameter that can be fixed or can depend on the hierarchical structure (i.e., all actors with distance 3 of the node corresponding to the actor 130) as well as the type of module with insufficient data. An example hierarchical structure 114 comprises a user 1 as the CEO of the tenant organization 106, and users 2 and 3 who are a CFO and a HR lead, respectively, of the tenant organization 106 and are connected below user 1 in the hierarchical structure. In this instance the two closest users to user 1 are user 2 and user 3. The example hierarchical structure 114 can further have user data embedded at each node such as user nationality, job title, associated teams, etc. While described as users, nodes in the hierarchical structure defined in the directory service data 110 can correspond to entities and, more generally, actors of the tenant organization 106 that include users. Moreover, although described as a hierarchical structure, a directory service that generates the directory service data 110 can maintain any graphic data structure that represents proximity of actors within the tenant organization 106 according to some notion of organizational structure.

Once the system 101 identifies the N closest actors to the actor 130, the system 101 retrieves data from actor activity data 108 from the time period to input into those of the modules 103A-103C with insufficient data. For instance, the system 101 can update frequencies of activity volume within bucketed time windows, frequencies of events with particular types, and frequencies of activity time within bucketed time windows with activity data from actor activity data 108 for the N closest actors, etc. In some embodiments, the system 101 is configured to collect data for the N closest actors for one or more of the modules 103A-103C independent of whether there is sufficient or insufficient data within a time window.

The modules 103A-103D are described as one or more probability models and neural networks. More generally, modules implemented by the system 101 can comprise any machine learning or statistical models depending on available computing resources, desired accuracy of anomalousness scores, etc. Modules are interchangeable and the anomalousness likelihood aggregator 109 can be configured to accept dynamically sized inputs indicating likelihoods and types of modules that generated the likelihoods so as to appropriately generate the anomalousness score 120. Implementation of modules can vary per-actor and per-tenant organization based on desired or preconfigured preferences.

The anomalousness likelihood aggregator ("aggregator") 109 receives the likelihoods 112A-112D output by modules 103A-103D, respectively, and decorrelates/averages logarithms of the likelihoods 112A-112D to generate an anomalousness score. The decorrelation step attempts to make likelihood values output by each module independent, such that the joint probability of every likelihood occurring is their product, i.e., their sum as logarithms. The decorrelation of log likelihoods occurs first within each module when the modules have multiple likelihoods as outputs (i.e., modules 103A-103C) and then across the modules 103A-103D. Decorrelation within each module occurs in three stages. First, the aggregator 109 determines a correlation matrix for pairs of probability distributions modeled by a module (later referred to as "sub-modules"). The aggregator 109 then identifies sets of probability distributions that are heavily correlated according to the correlation matrix and replaces each set with its average probability distribution. Finally, the aggregator 109 then recomputes the correlation matrix for the potentially averaged probability distributions and weights each probability distribution according to the recomputed correlation matrix to determine updated likelihoods for the module. The aggregator 109 then averages likelihoods across the module to determine a single likelihood for each of the modules 103A-103D. Finally, the aggregator 109 determines a correlation matrix between the modules 103A-103D and generates the anomalousness score 120 as a weighted average of the single likelihoods weighted according to the correlation matrix. The operations for decorrelating likelihoods are described in greater detail and with illustrative examples in reference to FIG. 6.

Figure 2:
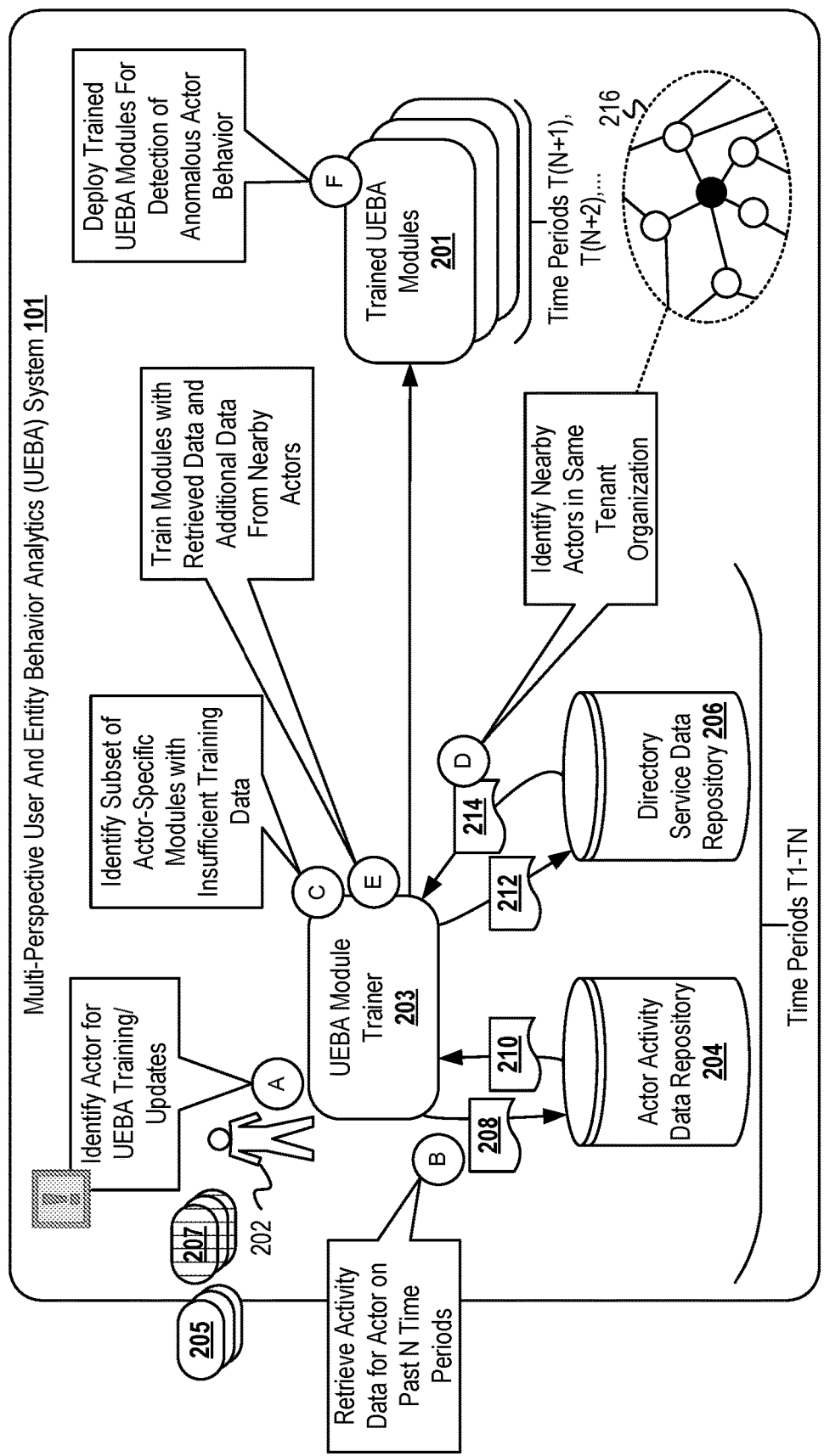
FIG. 2 is a schematic diagram of an example multiple-perspective UEBA system for training/updating and deploying multiple modules to identify anomalous behavior of an actor in a tenant organization.

FIG. 2 is a schematic diagram of an example multiple-perspective UEBA system for training/updating and deploying multiple modules to identify anomalous behavior of an actor in a tenant organization. The system 101 in FIG. 2 continuously collects new activity data for actors across the tenant organization (not depicted) and dumps old activity data asynchronously to training, updating, and deploying modules for anomaly detection according to multiple behavior perspectives. New activity data is added to repositories, analyzed along various vectors for potential risk, and discarded once the data is no longer germane to UEBA (e.g., after 3 months or a year). Training and updating various modules for UEBA of an identified actor in the tenant organization is depicted in FIG. 2 with a series of letters A-F. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the system 101 identifies an actor 202 for UEBA training/updates of corresponding modules deployed for detection of anomalous behavior of the actor. Training and/or updates can occur per-actor according to a fixed schedule (e.g., every month) or can occur based on an external trigger such as an administrator of the system 101 identifying one or more actors, a firewall of a tenant organization of the actor 202 identifying the actor 202 in association with SaaS application activity, etc. Although depicted as a single actor for simplicity, the operations in FIG. 2 can be performed simultaneously/in parallel for multiple actors from the tenant organization, where each actor has at least a subset of the modules unique to that actor apart from a distinct subset of modules trained across all actors. The system 101 further identifies two sets of modules maintained for the actor 202—a set of actor-specific modules 205 and a set of tenant organization modules 207. The actor-specific modules 205 are trained in the context of historical data for the actor 202 whereas the tenant organization modules 207 are trained on historical data across actors throughout the tenant organization. Each module is trained to predict a likelihood that behavior of the actor 202 (and/or other actors in the tenant organization) is anomalous. Note that actor-specific modules 205 and tenant organization modules 207 can both be sub-modules of modules maintained by the system 101 that model a particular perspective of actor behavior.

At stage B, a UEBA model trainer ("trainer") 203 retrieves activity data 210 for the actor 202 over the past N time periods. The trainer 203 communicates a query 208 to an actor activity data repository 204 indicating an identifier of the actor 202 and parameters of the past N time periods and the repository 204 returns the activity data 210. The activity data 210 comprises event data for activity of the actor 202 related to one or more SaaS applications used by the tenant organization over the past N time periods T(1)-T(N). N is a tunable parameter that is chosen to minimize variability due to outside factors such as the actor 202 changing residency, sleeping schedule, position at the tenant organization, work productivity, etc. The repository 204 can receive and store actor activity data as the data are detected in association with the actor 202 and the one or more SaaS applications by a firewall and forwarded to the system 101. The repository 204 can dump data previous to the past N time periods for efficiency in storage when this data is no longer desired for additional training/updates.

At stage C, the trainer 203 identifies a subset of the actor-specific modules 205 with insufficient training data. For instance, the trainer 203 can determine that an amount of historical activity data collected for one or more perspectives of actor behavior of the actor 202 in the past N time periods is below a threshold amount of historical activity data for those perspectives. The threshold amount of historical activity data can vary by perspective.

At stage D, the trainer 203 identifies nearby actors to the actor 202 in the same tenant organization. The trainer 203 identifies nearby actors according to a hierarchical structure defined by a directory service of the tenant organization, for instance example graph data structure 216. Nearby actors can be identified based on a threshold number of nearby actors (e.g., by breadth-first searching the hierarchical structure), based on a threshold distance from the actor 202, etc. Different sets of nearby actors can be identified for different perspectives of actor behavior for which corresponding modules have insufficient training data. For instance, the trainer 203 can identify more distant actors for modules with more training data. For each nearby actor for a behavior perspective/module, the trainer 203 retrieves activity data for those actors in the N past time periods to add to training data.

At stage E, the trainer 203 trains at least the actor-specific modules 205 and, in some embodiments, the tenant organization modules 207 on the retrieved data and the additional data from nearby actors. Because the tenant organization modules 207 are trained on data from across the tenant organization, model training of these modules can occur asynchronously to training of the actor-specific module 205 and based on separate triggers. Each module is trained according to its corresponding architecture and/or training criteria. In some instances, when the modules 205, 207 have been previously trained, the trainer 203 can instead update the modules. Some model architectures for models implemented by the modules such as fitted probability distributions allow for efficient updates due to lost cost computation of best-fit parameters with updated training data.

At stage F, the trainer 203 deploys those of the modules 205, 207 trained at stage E as trained UEBA modules 201 for detection of anomalous behavior of the actor 202 in future time periods T(N+1), T(N+2), . . . . Training/updating of modules for the actor 202 and other actors of the tenant organization can occur simultaneously and in parallel. For instance, the trainer 203 can collect/retrieve historical activity data for actors across the tenant organization in the past N time windows and can sort data for each behavior perspective into appropriate modules for each actor for training based on sparsity and module/sub-module scope (e.g., actor-specific or tenant organization-wide) constraints.

Figure 3:
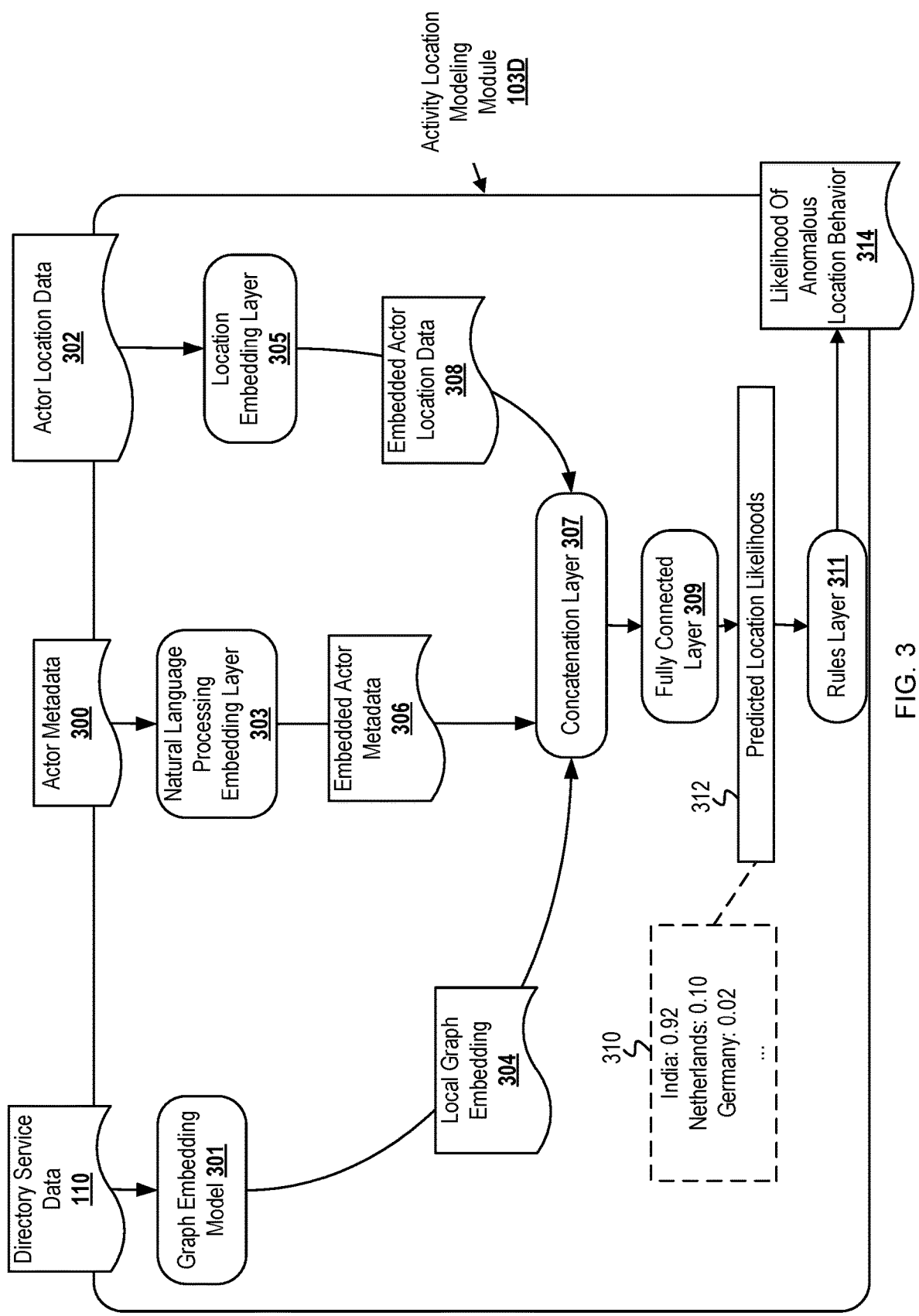
FIG. 3 is a schematic diagram of an example architecture for a neural network comprising an activity location modeling module of a multi-perspective UEBA system.

FIG. 3 is a schematic diagram of an example architecture for a neural network comprising an activity location modeling module of a multi-perspective UEBA system. The activity location modeling module 103D comprises 3 input layers—a graph embedding model 301, a natural language processing (NLP) embedding layer 303 and a location embedding layer 305 that receive directory service data 110, actor metadata 300, and actor location data 302, respectively, as inputs. The directory service data 110 comprises a data structure for a hierarchical graph of an organization representing relative hierarchy of actors within the organization according to their professions. The graph embedding model 301 applies a graph embedding algorithm that captures local topological information around an actor specified in the directory service data 110 to generate a local graph embedding 304, for instance the node2vec algorithm. The graph embedding model 301 is trained separately from the remainder of the module 103D using directory service data 110 across the organization. The other layers of the module 103D are trained as an ensemble.

The NLP embedding layer 303 and location embedding layer 305 both comprise an NLP embedding such as Global Vectors for Word Representation (GloVe) embeddings that can be initialized and refined during training. The actor location data 302 comprises indicators of each location visited by the actor within a time period and actor metadata 300 comprises metadata of the actor, for instance as stored by a directory service including actor profession, residence, etc. Embedded actor metadata 306 and embedded actor location data 308 comprise outputs from NLP embedding steps by the NLP embedding layer 303 and the location embedding layer 305, respectively.

A concatenation layer 307 receives and concatenates the outputs 304, 306, and 308 and feeds the concatenated outputs into a fully connected layer 309. The fully connected layer 309 has output of length equal to the number of countries monitored by the module 103D and each entry indicates a likelihood that activity of the actor at the location (i.e., country) corresponding to that entry comprised anomalous actor behavior. As an example of predicted location likelihoods 312 output by the fully connected layer 309, example likelihoods 310 indicate that actor activity in India has a 0.92 likelihood of corresponding to anomalous behavior, actor activity in the Netherlands has a 0.10 likelihood of corresponding to anomalous behavior, and actor activity in Germany has a 0.02 likelihood of corresponding to anomalous behavior. A rules layer 311 receives the predicted location likelihoods 312 and generates a likelihood of anomalous behavior 314. The rules layer 311 applies rules that vary by location to determine the likelihood 314. For instance, the rules can generate higher likelihoods of anomalous behavior for locations known to have higher cybersecurity risk, e.g., China or Russia.

FIGS. 4-8 are flowcharts of example operations for training and implementing a multi-perspective UEBA system for detecting anomalous actor behavior in a tenant organization using a malleable module-based architecture that captures multiple perspectives of actor behavior. The example operations are described with reference to the multi-perspective UEBA system ("system"), a firewall, and a UEBA module trainer ("trainer") for consistency with the earlier figure(s) and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Figure 4:
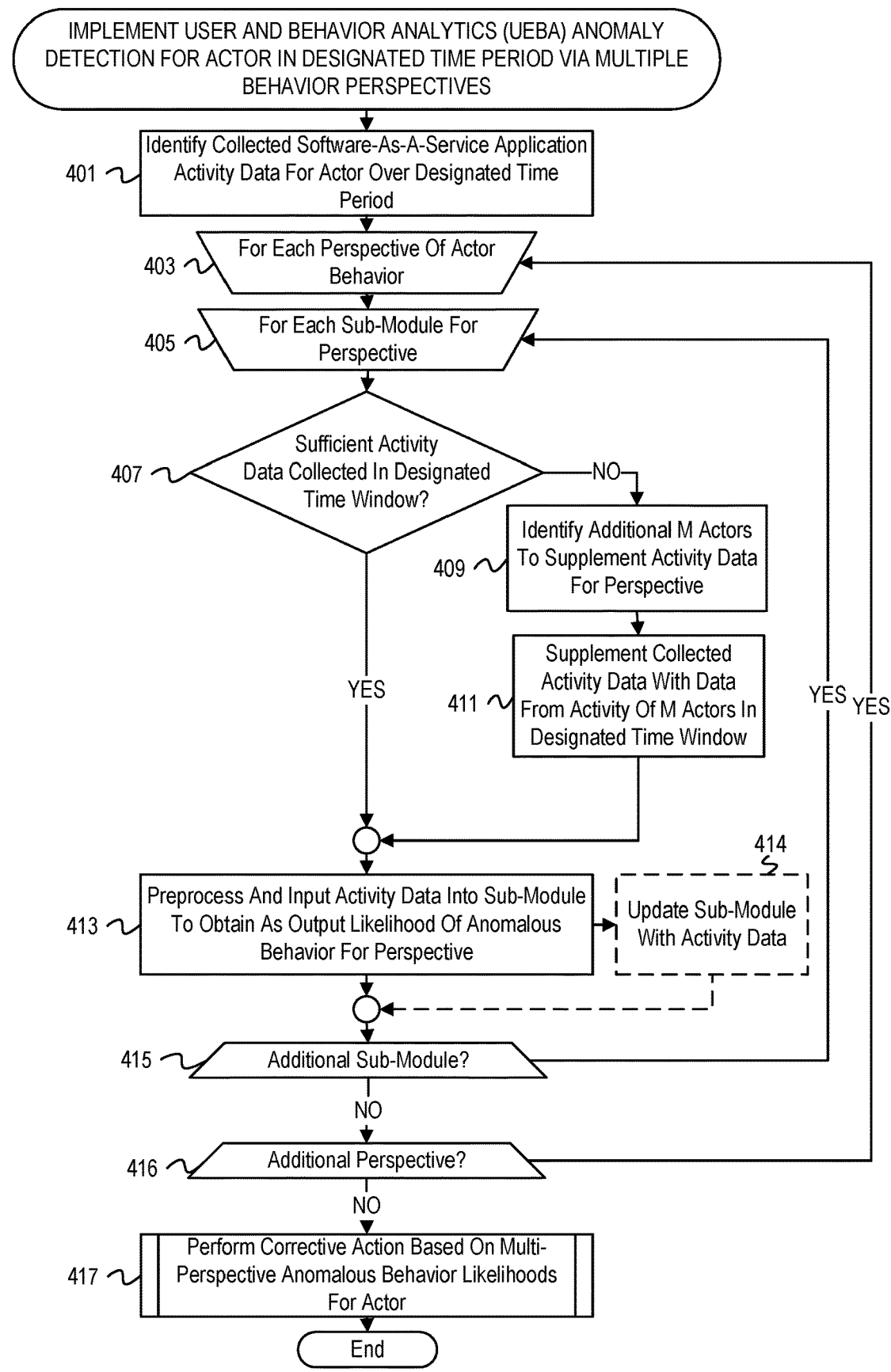
FIG. 4 is a flowchart of example operations for implementing UEBA anomaly detection for an actor in a designated time period via multiple behavior perspectives.

FIG. 4 is a flowchart of example operations for implementing UEBA anomaly detection for an actor in a designated time period via multiple behavior perspectives. At block 401, a multi-perspective UEBA system ("system") identifies collected SaaS application activity data for the actor over a designated time period. The designated time period can be a period designated according to a schedule for the system maintained by a tenant organization (e.g., every week) or based on an external trigger such as an audit of the actor by an administrator.

At block 403, the system begins iterating through perspectives of actor behavior. Each perspective corresponds to feature values generated from features of the collected SaaS application activity data over the designated time period.

At block 405, the system begins iterating through sub-modules for a perspective. For instance, an activity volume modeling module can comprise sub-modules corresponding to each application/action pair for actions taken by and applications used by the actor in the time period (e.g., downloads for application A, downloads for application B, clicks for application A, etc.). Modules can vary in terms of number of sub-modules and some modules, for instance an activity location modeling module, can comprise one sub-module.

At block 407, the system determines whether there is sufficient SaaS application activity data collected for the sub-module of the perspective in the designated time window. For instance, the system can determine whether the number of feature values for the feature corresponding to the sub-module is above a threshold number of feature values, whether there are a sufficient number of events corresponding to actor activity in the designated time window, etc. Alternatively, the system can evaluate sparsity of the activity data, for instance whether activity data is missing in certain peak time slots and can determine that there is insufficient activity data when the activity data is too sparse. Criteria for whether there is sufficient activity data can vary by perspective. If the SaaS application activity data is insufficient for the perspective in the designated time window, operational flow proceeds to block 409. Otherwise, operational flow skips to block 413.

At block 409, the system identifies an additional M actors to supplement activity data for the perspective. For instance, the system can identify the nearest M actors according to a breadth-first search of a hierarchical structure of actors in a same tenant organization defined by a directory service until M actors are identified. Alternatively, the system can identify actors within a threshold distance of the actor and M can vary based on the number of actors found. Algorithms and/or criteria for identifying the additional M actors can vary by perspective and sub-module.

At block 411, the system supplements the collected activity data with data from SaaS application activity of the M actors in the designated time window. The system can access/retrieve the collected activity data from a repository that receives activity data from a firewall as it is detected in user traffic/processes running on endpoint devices.

At block 413, the system preprocesses and inputs the activity data into the sub-module to obtain as output a likelihood of anomalous behavior of the actor in the designated time period according to the perspective of actor behavior. Preprocessing varies by sub-module. For instance, the system generates frequencies of certain events or event types for a probability model. For a machine learning model, the system applies various embedding and normalization steps, etc.

At block 414, the system updates the sub-module for the perspective with the activity data. Certain sub-modules are amenable to efficient updates with the activity data, for instance probability models that fit probability distributions to historical activity data since these probability models can maintain frequencies related to actor activity in historical activity data and can efficiently update the frequencies with additional activity data. Block 414 and its incoming/outgoing arrows are depicted with dashed lines to indicate that these operations are optional and can vary across implementations. For instance, for modules that are actor-specific, the system can perform the operations at block 414 whereas for sub-modules that are tenant organization-wide, the system can omit the operations at block 414.

At block 415, the system continues iterating through sub-modules of the module for the perspective. If there is an additional sub-module, operational flow returns to block 403. Otherwise, operational flow proceeds to block 416.

At block 416, the system continues iterating through perspectives of actor behavior. If there is an additional perspective, operational flow returns to block 405. Otherwise, operational flow returns to block 417.

At block 417, the system performs corrective action based on the multi-perspective anomalous behavior likelihoods for the actor in the designated time period. The corrective action is determined based on an anomalousness score for the actor generated from the anomalous behavior likelihoods. The operations at block 417 are described in greater detail in reference to FIG. 5.

Figure 5:
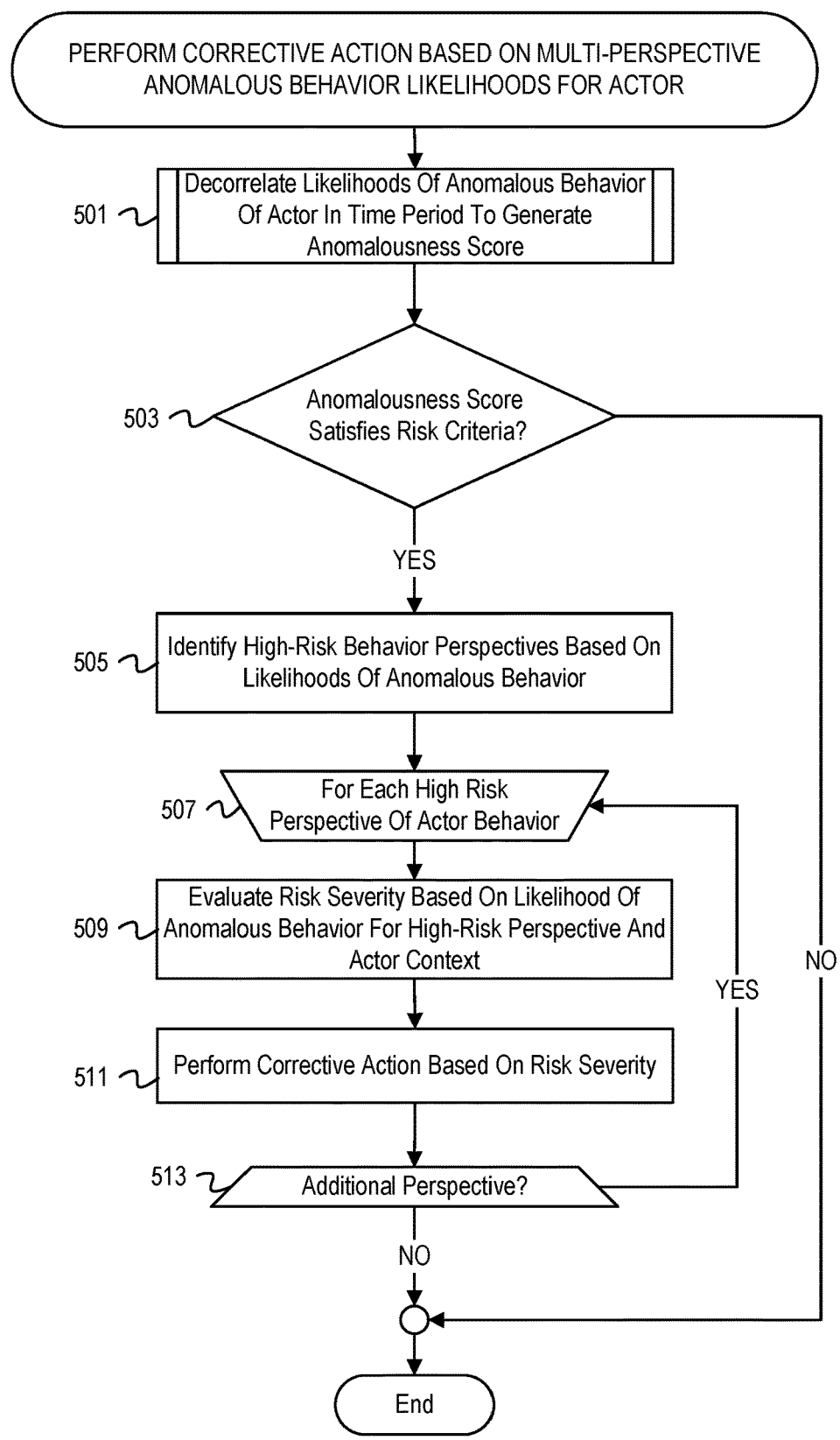
FIG. 5 is a flowchart of example operations for performing corrective action based on multi-perspective anomalous behavior likelihoods for an actor.

FIG. 5 is a flowchart of example operations for performing corrective action based on multi-perspective anomalous behavior likelihoods for an actor. At block 501, a multi-perspective UEBA system ("system") decorrelates likelihoods of anomalous behavior of the actor in a time period to generate an anomalousness score. The operations at block 501 are described in greater detail in reference to FIG. 6.

At block 503, the system determines whether the anomalousness score satisfies risk criteria. For instance, the risk criteria can be that the anomalousness score lies within thresholds and/or ranges that indicate risk and/or levels of severity for risk. If the anomalousness score satisfies the risk criteria, operational flow proceeds to block 505. Otherwise, the operational flow in FIG. 5 is complete and the actor is not flagged for potentially anomalous behavior in the time period.

At block 505, the system identifies high-risk behavior perspectives based on the likelihoods of anomalous behavior. For instance, the high-risk behavior perspective can be identified as corresponding to the top-k likelihoods for some parameter k. Alternatively, each perspective can have a corresponding likelihood threshold above which that perspective is identified as high-risk.

At block 507, the system begins iterating through identified high-risk behavior perspectives. Although operations for corrective action are depicted per-behavior perspective, corrective action can be performed based on risk evaluated across all perspectives, for instance based on the set of high-risk behavior perspectives or the anomalousness score alone.

At block 509, the system evaluates risk severity for security exposure associated with activity of the actor in the time period based on the likelihood of anomalous behavior of the high-risk perspective and context of the actor. For instance, certain high-risk perspectives known to more directly impact overall risk can trigger a higher risk severity. Actor context can include metadata such as job title and profession, and certain metadata values (e.g., the actor is the CEO or other high ranking executive) can additionally trigger a higher risk severity.

At block 511, the system performs corrective action based on the risk severity. The corrective action can comprise terminating sessions/flows associated with SaaS application activity of the actor, generating an alert to the actor and/or a security administrator of the tenant organization, scanning endpoint devices, databases, etc. exposed by activity of the actor, etc. Corrective actions can be sorted by tiers and certain corrective actions can only occur for higher-severity tiers.

At block 513, the system continues iterating through high-risk perspectives of actor behavior. If there is an additional high-risk perspective, operational flow returns to block 507. Otherwise, the operations in FIG. 5 are complete.

Figure 6:
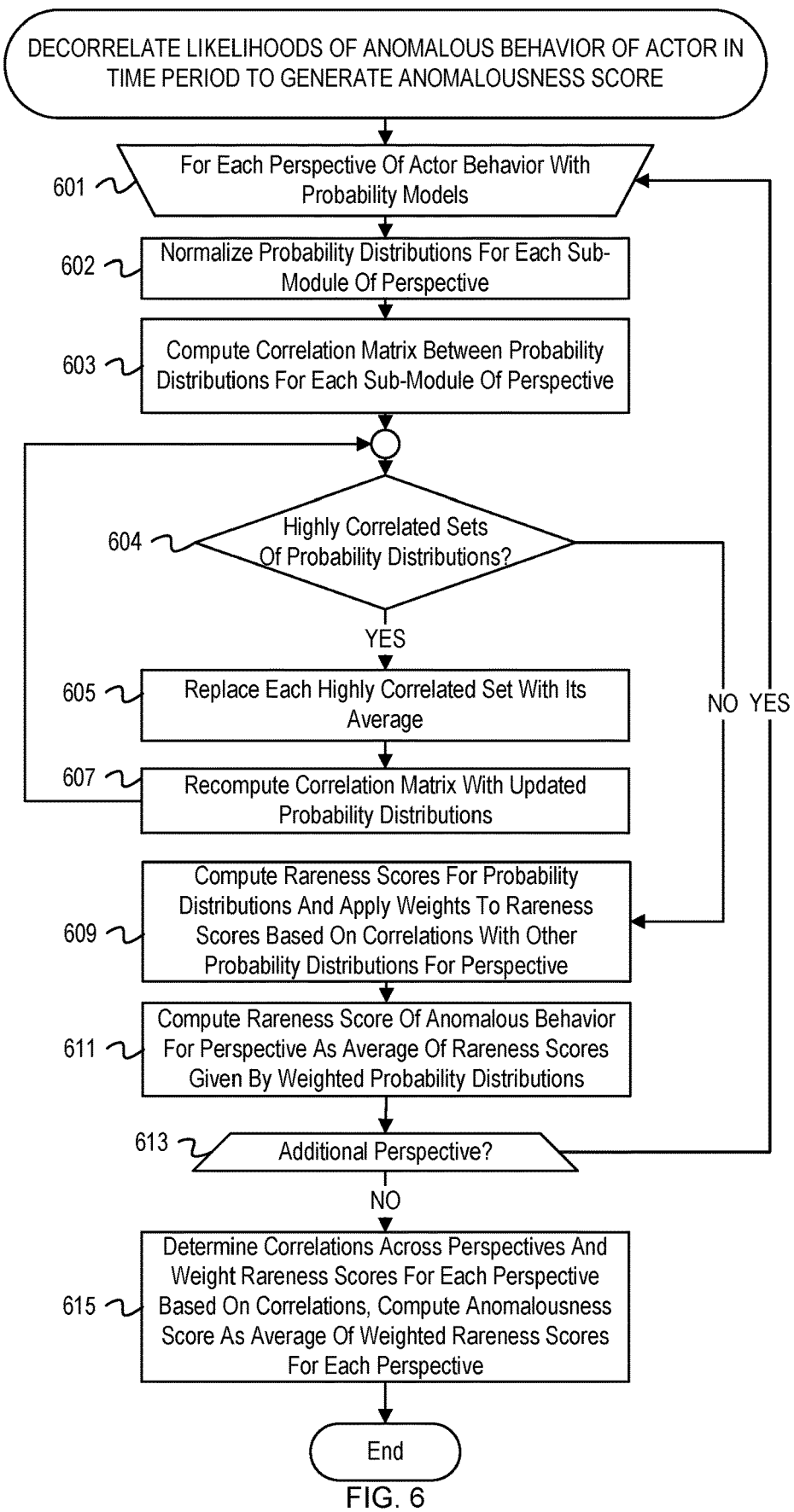
FIG. 6 is a flowchart of example operations for decorrelating likelihoods of anomalous behavior of an actor in a time period to generate an anomalousness score.

FIG. 6 is a flowchart of example operations for decorrelating likelihoods of anomalous behavior of an actor in a time period to generate an anomalousness score. The likelihoods of anomalous behavior are decorrelated to remove redundant, correlated models within each module and sub-module of a multi-perspective UEBA system ("system"). Without decorrelations, likelihoods for heavily correlated models are counted multiple times and thus the predictions of these models have undue impact on the anomalousness score. As an illustrative example, one model for a sub-module of an activity volume module of the system may predict likelihood of number of downloads within an hour of the day for the actor and an application A while another sub-module may predict number of page requests for the actor and the application A within the same hour of the day. It is expected that outputs of these models are heavily correlated and therefore at least partially redundant when generating the anomalousness score At block 601, the system begins iterating through perspectives of actor behavior for which the system maintains one or more probability models as sub-modules of a module corresponding to each perspective. Each module corresponding to a perspective can comprise one or multiple probability models. For modules comprising one probability model (e.g., an activity time modeling module), the system can skip the operations for decorrelating at each iteration.

At block 602, the system normalizes probability distributions for each sub-module of the perspective. For instance, suppose the perspective is activity volume and there are probability distributions X, Y, Z, V that represent downloading volume for app1, preview volume for app1, upload volume for app1, and preview volume for app2, respectively. First, the system computes logarithms of each probability distributions as X'=log(X+1), Y'=log(Y+1), Z'=log(Z+1), V'=log(V+1). This processing step is because probability distributions for most perspectives typically resemble log-normal or power-law distributions and taking the logarithm makes these distributions more closely resemble Gaussian distributions. Then, the system normalizes each probability distribution by their standard deviations as $x=X'/\sigma_{X'}$, $y=Y'/\sigma_{Y'}$, $z=Z'/\sigma_{Z'}$, $v=V'/\sigma_{V'}$, wherein $\sigma$ is the standard deviation of the distribution in the subscript. This normalizes the random variables to resemble Gaussian distributions with standard deviation 1 which are conducive to correlation analysis.

At block 603, the system computes a correlation matrix between probability distributions of each sub-module of a perspective. For instance, the entry in the correlation matrix corresponding to the pair of distributions X, Y is computed as $E[(X-\mu_X)(Y-\mu_Y)]/(\sigma_X\sigma_Y)$, where E is the expectation and $\mu$ is the mean of the distribution in the subscript. Each entry of the correlation matrix is in the interval [0,1] and measures how correlated the corresponding pair of random variables are, i.e., how similar their probability density functions are, with values close to 1 indicating heavier correlation.

At block 604, the system determines whether there are heavily correlated sets of probably distributions for sub-modules of the perspective. For instance, the system can identify sets of probability distributions such that every pair of probability distributions in the set has a correlation above a threshold correlation (e.g., 0.85). Note that sets are chosen in this manner such that all pairwise correlations are above the threshold. For instance, if x and y have correlation 0.91, y and z have correlation 0.95, but y and z have correlation 0.3, then rather than grouping all of x, y, z into a same heavily correlated set, the system generates two sets—{x, y} and {y, z} (assume v has low correlation with all of the other random variables so that it is in its own set).

At block 605, the system replaces each set of heavily correlated distributions with its average. Replacing each set with its average comprises removing each random variable in one of the sets and adding a new random variable for each set that is the average of the random variables. In the previous example, the set of random variables {x, y, z, v} is replaced by the set {x', y', v} where x'=(x+y)/2 and y'=(y+z)/2.

At block 607, the system recomputes the correlation matrix with the updated probability distributions. The system computes correlations according to the aforementioned formula for the new set of random variables. Note that while depicted as a single instance of averaging heavily correlated probability distributions and recomputing the correlation matrix at each iteration, this process can occur multiple times until there are no longer heavily correlated probability distributions.

At block 609, the system computes a rareness score for each probability distribution and applies a weight to each rareness score based on correlations with other probability distributions for the perspective. The system constructs probability density functions for each of the resulting random variables, which are denoted p(x'), p(y'), p(v) for the previous example. The system then generates rareness scores for each probability density function by taking a negative logarithm of each probability density function (so that larger scores correspond to higher rareness) and applying weights. The weights downscale probability density functions corresponding to random variables with heavy correlations to many other variables. For instance, the weights can be inverses of the sum of the correlations of a random variable with each other random variable. To exemplify, using the previous example first the system generates rareness scores as $S(x')=-\log(p(x'))$, $S(y')=-\log(p(y'))$, $S(v)=-\log(p(v))$. Suppose $c_{x',y'}=0.4$, $c_{x',v}=0.1$, and $c_{y',v}=0.2$. Then, each of the rareness scores are down-weighted as $w(x')=S(x')/(0.4+0.1)$, $w(y')=S(y')/(0.4+0.2)$, and $w(v)=S(v)/(0.1+0.2)$.

At block 611, the system computes a rareness score for anomalous behavior for the perspective as an average of rareness scores given by the weighted probability distributions. The overall rareness score is given as an average of each rareness score, i.e., $S=(w(x')+w(y')+w(v))/3$ in the previous example. The system retrieves the events corresponding to each distribution for the actor over the time period (e.g., activity volume of the actor from 2 μm to 3 pm for application A) and determines the likelihood of each event given by the probability distributions. Suppose events $e_X$, $e_Y$, $e_Z$, $e_V$ were observed for random variables X, Y, Z, V in the time period. Then, the system determines p(x'), p(y'), and p(v) based on these observed events according to these probability density functions and computes the score for anomalous behavior based on the foregoing formulas. The rareness score S is higher for higher rareness (i.e., higher likelihood of anomalous behavior) and lower for lower rareness (i.e., higher likelihood of normal behavior.

At block 613, the system continues iterating through perspectives of the system. If there is an additional module corresponding to a perspective that comprises multiple probability models, operational flow returns to block 601. Otherwise, operational flow proceeds to block 615.

At block 615, the system determines correlations across perspectives and weights rareness scores for each perspective based on the correlations. The system then computes the anomalousness score as an average of the weighted scores for each perspective. For instance, the system can determine the correlations according to the foregoing formula using probability density functions corresponding to each module and can weight the rareness scores using an inverse of a sum of correlations with other modules as in the foregoing.

Figure 7:
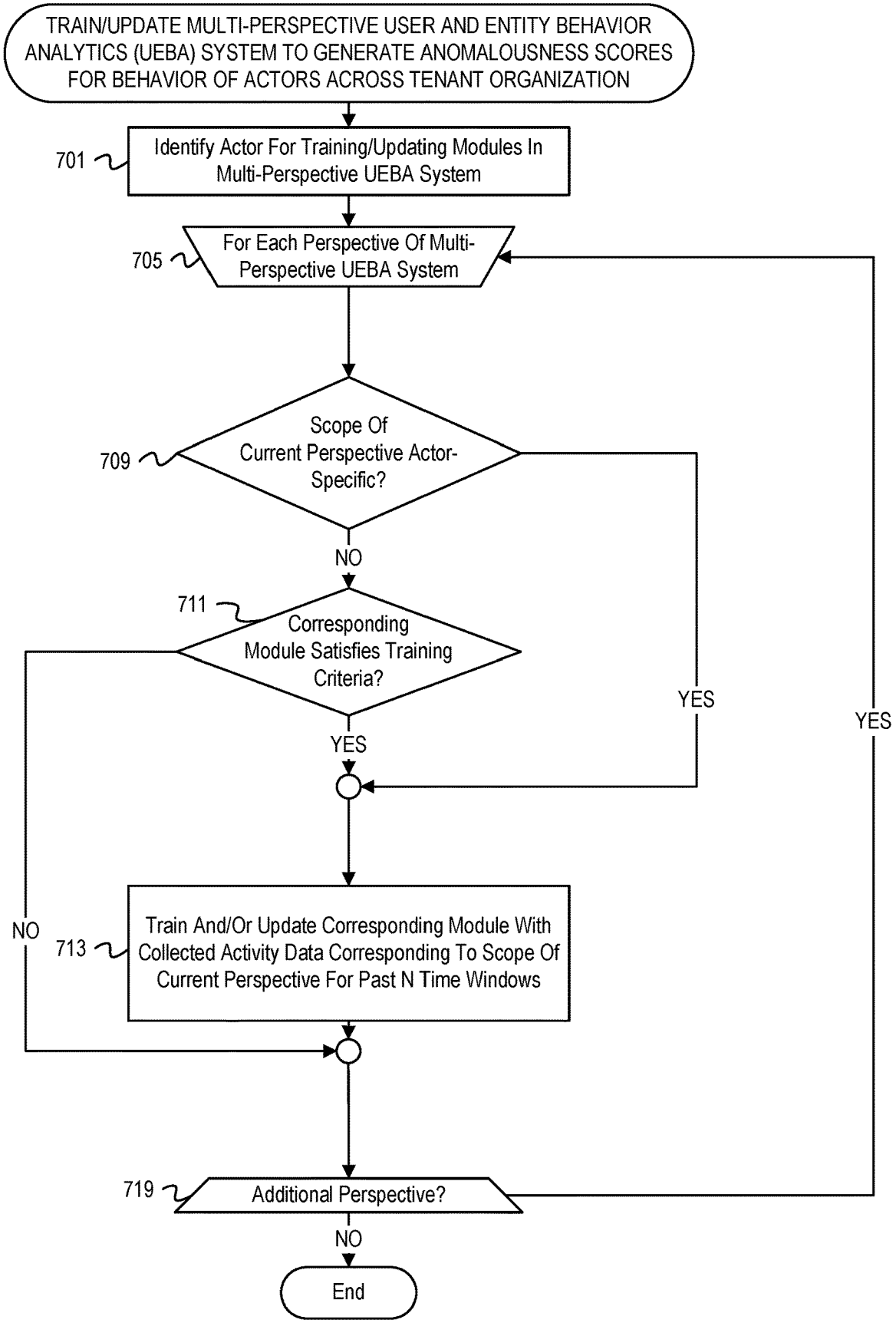
FIG. 7 is a flowchart of example operations for training/updating a multi-perspective UEBA system to generate anomalousness scores for behavior of actors across a tenant organization.

FIG. 7 is a flowchart of example operations for training/updating a multi-perspective UEBA system to generate anomalousness scores for behavior of actors across a tenant organization. FIG. 7 is described in reference to a single actor in the tenant organization for simplicity of presentation. Modules maintained by the multi-perspective UEBA system ("system") can have varying scopes across multiple actors and be trained/updated for all actors within the scope simultaneously. Training and updating of modules with varying scopes can occur asynchronously according to differing schedules and/or triggers and when updating actor-specific modules, modules with scopes beyond a particular actor need not be trained updated at the same time.

At block 701, a UEBA module trainer ("trainer") identifies an actor for training/updating modules in the system. For instance, the trainer can identify the actor according to a schedule for updating modules associated with the actor (e.g., every month) or based on an external trigger such as an administrator prompting updating and/or training of modules for the actor or a firewall detecting SaaS application activity of a previously unseen actor for a tenant organization. While FIG. 7 depicts training/updating being triggered by identification of an actor, alternatively training can be triggered by identification of a module for training/updating, and operations for iterating through perspective/scopes of actors can be omitted.

At block 705, the trainer begins iterating through perspectives of a multi-perspective UEBA system. In some embodiments, the trainer can omit perspectives corresponding to modules with scopes beyond particular actors and can train/update these modules in a separate pipeline.

At block 709, the trainer determines whether the scope of the current perspective is actor-specific. The scope of the current perspective comprises a scope of actors for the tenant organization for which training data is collected to train a module corresponding to the current perspective for the actor. If the scope is actor-specific, operational flow skips to block 713. Otherwise, operational flow proceeds to block 711.

At block 711, the trainer determines whether the corresponding module satisfies training criteria. For modules with scope beyond a specific actor, these modules can be trained/updated according to a different schedule than each individual actor within the scope, and thus for the operations depicted in FIG. 7 training/updating of these modules can be postponed. The training criteria can be a determination of whether the corresponding module has a sufficient amount of additional historical activity data for actors across its scope, a time period since previous training/updates, whether the module is flagged for training/updates alongside training/updates of modules for each of the actors in its scope, etc. If the training criteria is satisfied operational flow proceeds to block 713. Otherwise, operational flow skips to block 719.

At block 713, the trainer trains and/or updates the corresponding module with collected activity data corresponding to the scope of the current perspective for the past N time windows. Training and/or updating occurs according to corresponding models, and the collected activity data is preprocessed accordingly. For probability models, training/updating occurs in a single pass by updating parameters of a fitted probability distribution. For a neural network, updating occurs in batches and epochs of training data until training criteria such as convergence of internal parameters, sufficiently low training/testing/validation error, etc. are satisfied.

At block 719, the trainer continues iterating through perspectives of the multi-perspective UEBA system. If there is an additional perspective, operational flow returns to block 705. Otherwise, the operational flow in FIG. 7 is complete.

Figure 8:
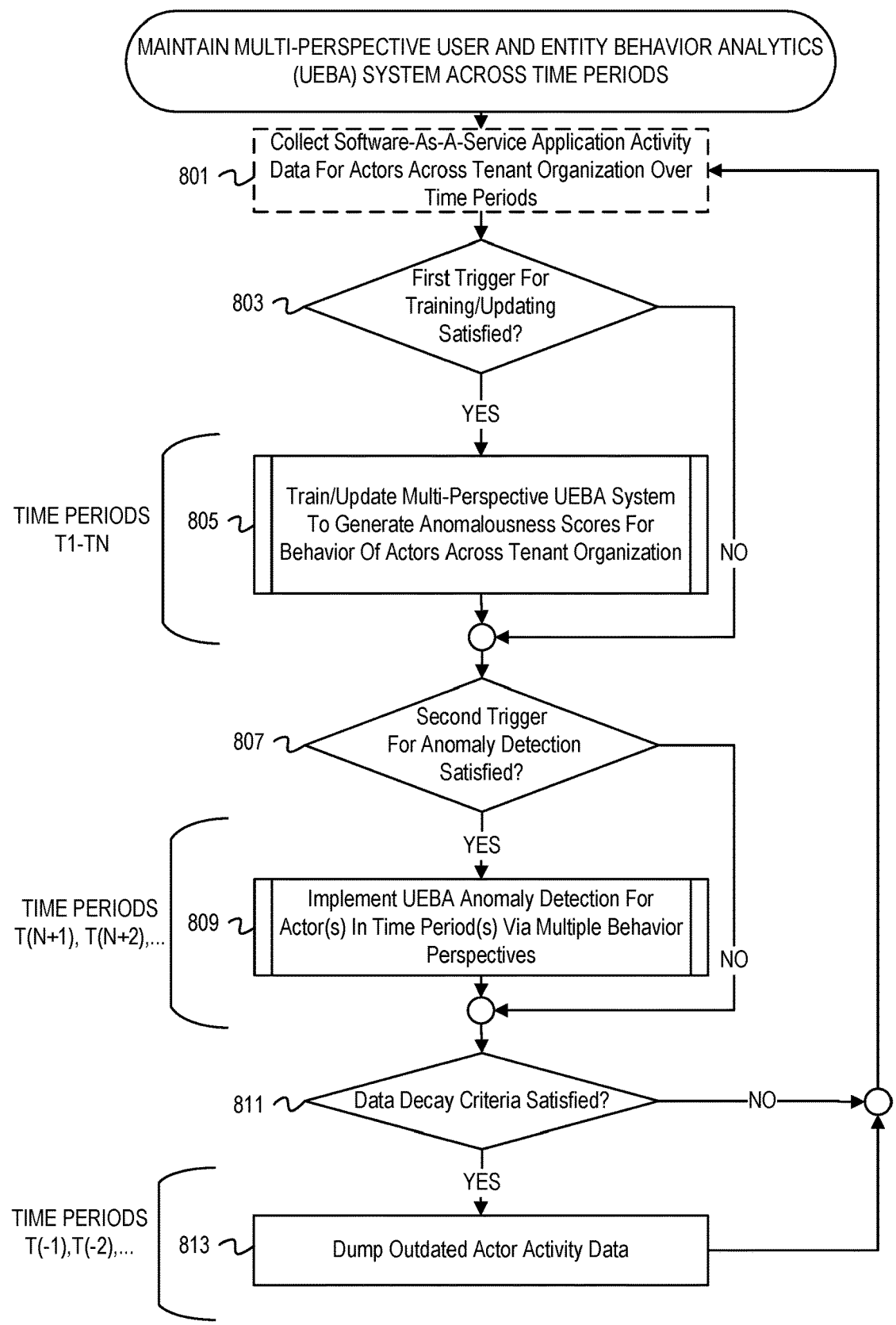
FIG. 8 is a flowchart of example operations for maintaining a multi-perspective UEBA system across time periods.

FIG. 8 is a flowchart of example operations for maintaining a multi-perspective UEBA system across time periods. At block 801, the multi-perspective UEBA system ("system") collects SaaS application activity data for actors across a tenant organization over time periods. For instance, the system can receive the activity data from a firewall as the firewall detects requests or communications to SaaS applications in internal and external network traffic of endpoints of the tenant organization. Block 801 is depicted with a dashed line to indicate that collection of SaaS application activity data occurs continuously and that the remaining operations occur asynchronously according to various triggers and criteria.

At block 803, the system determines whether a first trigger for training/updating is satisfied. The first trigger can be a trigger per-actor, per-perspective of user behavior, per-module maintained for a perspective and one or more actors, or a combination of any of the foregoing. The first trigger can be according to a corresponding schedule or based on external intervention such as detection of a new actor for the tenant organization. If the first trigger is satisfied, operational flow proceeds to block 805. Otherwise, operational flow skips to block 807.

At block 805, a UEBA model trainer ("trainer") trains/updates the system to generate anomalousness scores for behavior of actors across the tenant organization according to historical activity data for actors at previous N time periods T(1)-T(N). The operations at block 805 are described in greater detail in the foregoing in reference to FIG. 7.

At block 807, the system determines whether a second trigger for anomaly detection is satisfied. The second trigger can be per-actor, per-subdivision of the tenant organization, and/or across the entire tenant organization. For instance, each actor can have a schedule (e.g., every week) for anomaly detection of actor behavior. If the second trigger is satisfied, operational flow proceeds to block 809. Otherwise, operational flow skips to block 811.

At block 809, the system implements UEBA anomaly detection for actor(s) in a time period T(N+1), T(N+2), . . . via multiple behavior perspectives. The operations for each actor at each designated time period are described in the foregoing in reference to FIG. 4.

At block 811, the system determines whether data decay criteria are satisfied. For instance, the data decay criteria can comprise that data stored in a repository for historical activity of actors is older than a threshold amount (e.g., 6 months). If the data decay criteria are satisfied, operational flow proceeds to block 813. Otherwise, operational flow returns to block 801.

At block 813, the system dumps outdated actor activity data from time periods T(−1), T(−2), and so on. Operational flow returns to block 801.

Variations

The present disclosure refers variously to analysis of activity data for an actor to determine anomalous behavior while using SaaS applications. Other types of activity data can be analyzed for anomalous behavior, for instance activity data for background processes, activity data for processes launched by the SaaS applications themselves, etc.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 805 and 809 can be performed in parallel or concurrently. With respect to FIG. 4 updating the sub-module with activity data at block 414 is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 9:
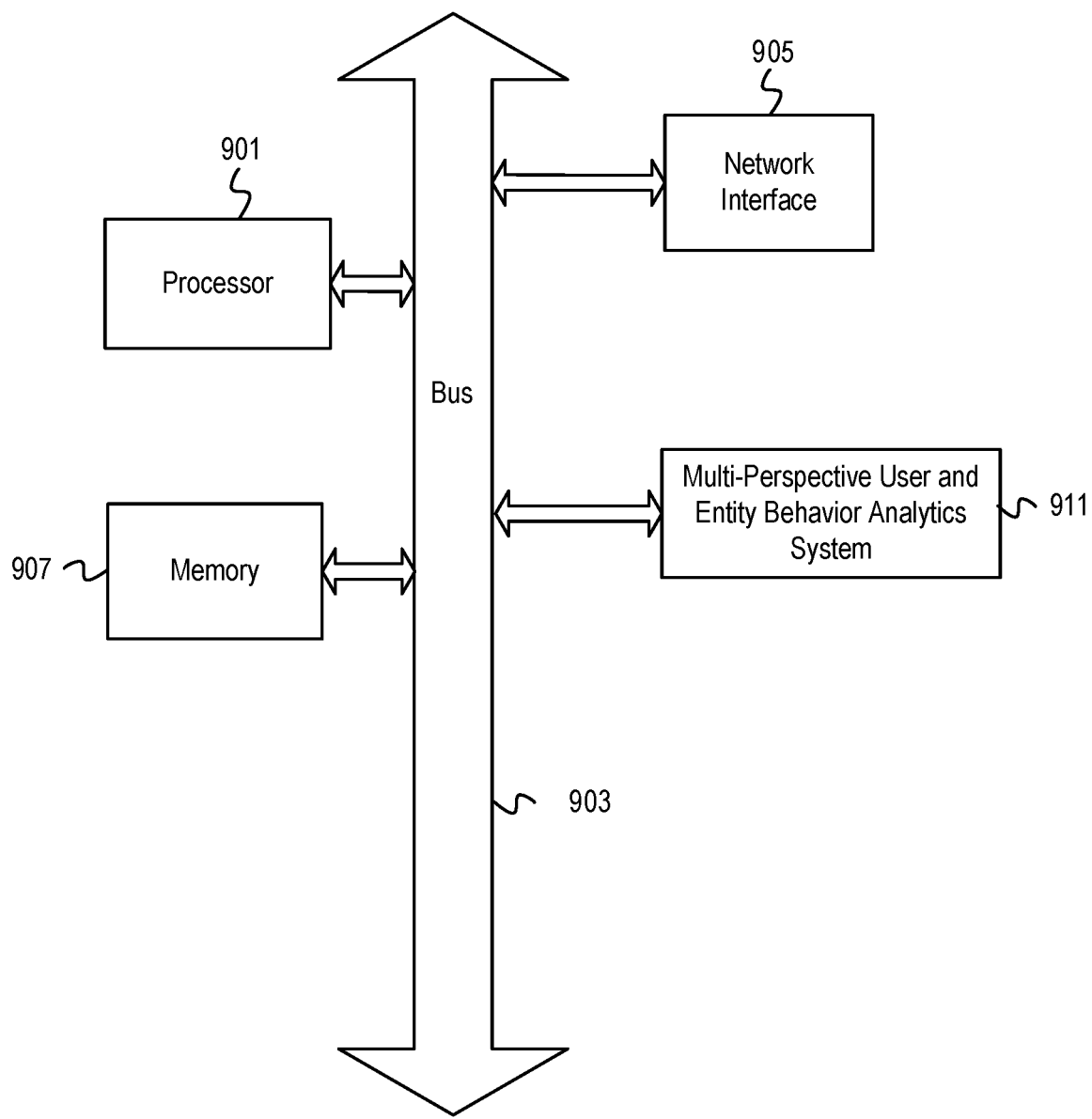
FIG. 9 depicts an example computer system with a multi-perspective UEBA system.

FIG. 9 depicts an example computer system with a multi-perspective UEBA system. The computer system includes a processor 901 (possibly including multiple processors, multiple cores, multiple nodes, and/or implementing multi-threading, etc.). The computer system includes memory 907. The memory 907 may be system memory or any one or more of the above already described possible realizations of machine-readable media. The computer system also includes a bus 903 and a network interface 905. The system also includes a multi-perspective UEBA system ("system") 911. The system 911 detects anomalous behavior of an actor within an organization using modules modeling perspectives of actor behavior. Each module comprises one or more probability models and/or machine learning models as sub-modules at further granularity such as within bucketed time windows of a time period and per SaaS application and per aspects of actor activity. The system 911 generates anomalousness scores by decorrelating and averaging likelihoods output by sub-modules within each module and output across modules. The system 911 can continuously train, update, redeploy, add, and remove modules to maintain security posture for each actor across the organization. Any one of the previously described functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

The invention claimed is:

1. A method comprising:
   collecting first data for cloud-based activity of a first actor and second data for cloud-based activity of one or more actors proximal to the first actor according to a directory service, wherein the first data and second data correspond to a first time window;
   training a plurality of machine learning models to detect anomalous behavior of the first actor with at least the first data, wherein at least a subset of the plurality of machine learning models are trained with the first data and the second data;
   generating a plurality of likelihood values that behavior of the first actor is normal in a second time window subsequent to the first time window, wherein generating the plurality of likelihood values comprises obtaining the plurality of likelihood values as outputs from inputting third data for the first actor from the second time window into the plurality of machine learning models; and
   aggregating the plurality of likelihood values to generate a score indicating likelihood of anomalousness for the behavior of the first actor in the second time window.

2. The method of claim 1, wherein the plurality of machine learning models comprises at least one of a probabilistic model of activity volume in actor activity of the first actor, a probabilistic model of activity types in actor activity of the first actor, a probabilistic model of activity time in actor activity of the first actor, and a neural network model of locations visited by the first actor.

3. The method of claim 1, wherein training the plurality of machine learning models comprises, for each machine learning model of at least a subset of the plurality of machine learning models,
   based on determining that a subset of the first data that represents an aspect of actor activity corresponding to the machine learning model is sufficient for training, fitting a probability distribution to the subset of the first data; and
   based on determining that the subset of the first data is insufficient for training, fitting the probability distribution to the subset of the first data and a subset of the second data that represents the aspect of actor activity corresponding to the machine learning model.

4. The method of claim 3, wherein the probability distribution comprises at least one of a power law distribution, a log-normal distribution, and a Gaussian distribution.

5. The method of claim 1, wherein the plurality of machine learning models comprises a neural network for predicting likelihood values that locations indicated in actor activity for at least the first actor correspond to normal behavior, wherein the neural network comprises an input layer for locations that the first actor has visited, an input layer for characteristics of the first actor, an input layer for characteristics of the one or more actors, and a concatenation layer that combines outputs of blocks of the neural network that include each of the input layers, further wherein training the neural network comprises training the neural network on third data collected for cloud-based activity of actors including the first actor across a tenant organization of the first actor.

6. The method of claim 1, wherein the one or more actors proximal to the first actor according to the directory service comprise actors proximal to the first actor in a graph data structure that models hierarchical roles of actors maintained by the directory service, wherein the hierarchical roles of actors comprise hierarchical roles of actors within a same tenant organization monitored by the directory service.

7. The method of claim 1, wherein aggregating the plurality of likelihood values to generate the score comprises,
   decorrelating the plurality of likelihood values to obtain a plurality of decorrelated likelihood values;
   generating the score as a sum of the plurality of decorrelated likelihood values;
   based on the score exceeding a threshold likelihood value, generating a verdict indicating that behavior of the first actor is normal in the second time window; and
   based on the score not exceeding the threshold likelihood value, generating a verdict indicating that behavior of the first actor is normal in the second time window.

8. The method of claim 1, wherein the plurality of machine learning models comprises one or more models for detecting anomalous access of sensitive documents by the first actor for data loss prevention.

9. A non-transitory machine-readable medium having program code stored thereon, the program code comprising instructions to:
   maintain a plurality of profiles of normal actor behavior for cloud-based activity of each of a plurality of actors to monitor actor entity and behavior analytics, wherein the instructions to maintain the plurality of profiles comprise instructions to, for each actor of the plurality of actors and corresponding profile in the plurality of profiles,
      collect first data for cloud-based activity of the actor and second data for cloud-based activity of one or more actors proximal to the actor in a data structure maintained by a directory service, wherein the first and second data occur in a first time window;
      train a plurality of machine learning models to predict scores for anomalous actor behavior for the actor with the first data, wherein training data for at least a subset of the plurality of machine learning models is supplemented with the second data, wherein the profile comprises the plurality of trained machine learning models; and
      update the profile based on third data for cloud-based activity of at least the actor collected in one or more time windows subsequent to the first time window.

10. The non-transitory machine-readable medium of claim 9, further comprising instructions to deploy the profile to generate scores indicating likelihood of anomalousness for behavior of the actor in the one or more time windows subsequent to the first time window, wherein the instructions to deploy the profile comprise instructions to, for a second time window of the one or more time windows,
- collect fourth data for cloud-based activity of the actor in the second time window, wherein the third data comprises the fourth data;
- obtain a plurality of likelihood values that behavior of the actor in the second time window is normal as outputs from inputting the fourth data into the plurality of trained machine learning models in the profile; and
- generate a score based on the plurality of likelihood values.

11. The non-transitory machine-readable medium of claim 10, wherein the instructions to generate the score based on the plurality of likelihood values comprise instructions to,
- decorrelate the plurality of likelihood values to generate a plurality of decorrelated likelihood values; and
- generate the score as a sum of the plurality of decorrelated likelihood values.

12. The non-transitory machine-readable medium of claim 9, wherein the plurality of machine learning models comprises at least one of a probabilistic model of activity volume in actor activity of the actor, a probabilistic model of activity types in actor activity of the actor, a probabilistic model of activity time in actor activity of the actor.

13. The non-transitory machine-readable medium of claim 9, wherein the plurality of profiles comprises a neural network model for predicting likelihood values of anomalous behavior in locations visited by actors including the plurality of actors across a tenant organization of the plurality of actors, wherein the neural network model comprises an input layer for locations that the actor has visited, an input layer for characteristics of the actor, an input layer for characteristics of the one or more actors, and a concatenation layer that combines outputs of blocks of the neural network model that include each of the input layers.

14. The non-transitory machine-readable medium of claim 9, wherein the instructions to train the plurality of machine learning models comprise instructions to, for each machine learning model of at least a subset of the plurality of machine learning models,
- based on determining that a subset of the first data that represents an aspect of actor activity corresponding to the machine learning model is sufficient for training, fit a probability distribution to the subset of the first data; and
- based on determining that the subset of the first data is insufficient for training, fit the probability distribution to the subset of the first data and a subset of the second data that represents the aspect of actor activity corresponding to the machine learning model.

15. The non-transitory machine-readable medium of claim 14, wherein the probability distribution comprises at least one of power law distribution, a log-normal distribution, and a Gaussian distribution.

16. The non-transitory machine-readable medium of claim 9, wherein the one or more actors proximal to the actor according to the directory service comprise actors proximal to the actor in a graph data structure that models hierarchical roles of actors maintained by the directory service, wherein the hierarchical roles of actors comprise hierarchical roles of actors within a same tenant organization monitored by the directory service.

17. An apparatus comprising:
- a processor; and
- a machine-readable medium having instructions stored thereon that are executable by the processor to cause the apparatus to,
- train a plurality of machine learning models to detect anomalous behavior of a first actor with first data of cloud-based activity of the first actor collected in a first time window, wherein each of the plurality of machine learning models is trained to detect anomalous behavior on a distinct one of a plurality of aspects of actor activity for the first actor; and
- deploy the plurality of trained machine learning models for detecting anomalous behavior of the first actor in time windows subsequent to the first time window, wherein the instructions executable by the processor to cause the apparatus to deploy the plurality of machine learning models comprise instructions to, for likelihood values obtained as outputs of the plurality of trained machine learning models based on inputs collected from data of cloud-based activity of the first actor in the subsequent time windows, aggregate the likelihood values to generate scores for anomalous behavior of the first actor in the subsequent time windows.

18. The apparatus of claim 17, wherein the machine-readable medium further has stored thereon instructions executable by the processor to cause the apparatus to, based on determining that each of at least a first subset of the plurality of machine learning models has insufficient data in the first data for training,
- identify one or more actors proximal to the first actor according to a directory service; and
- supplement training of the first subset of the plurality of machine learning models with second data collected for cloud-based activity of the one or more actors in the first time window.

19. The apparatus of claim 18, wherein the one or more actors proximal to the first actor according to the directory service comprise actors proximal to the first actor in a graph data structure that models hierarchical roles of actors maintained by the directory service, wherein the hierarchical roles of actors comprise hierarchical roles of actors within a same tenant organization monitored by the directory service.

20. The apparatus of claim 18, wherein the instructions to train the plurality of machine learning models comprise instructions executable by the processor to cause the apparatus to, for each machine learning model of at least a second subset of the plurality of machine learning models,
- based on determining that a subset of the first data that represents one of the plurality of aspects of actor activity corresponding to the machine learning model is sufficient for training, fit a probability distribution to the subset of the first data; and
- based on determining that the subset of the first data is insufficient for training, fitting the probability distribution to the subset of the first data and a subset of the second data that represents the aspect of actor activity corresponding to the machine learning model.

21. The apparatus of claim 20, wherein the probability distribution comprises at least one of a power law distribution, a log-normal distribution, and a Gaussian distribution.

22. The apparatus of claim 17, wherein the plurality of machine learning models comprises at least one of a probabilistic model of activity volume in actor activity of the first actor, a probabilistic model of activity types in actor activity of the first actor, a probabilistic model of activity time in actor activity of the first actor, and a neural network model of locations visited by the first actor.

23. The apparatus of claim 17, wherein the plurality of machine learning models comprises a neural network for predicting likelihood values that locations indicated in actor activity for at least the first actor correspond to normal behavior, wherein the neural network comprises an input layer for locations that the first actor has visited, an input layer for characteristics of the first actor, an input layer for characteristics of one or more actors proximal to the first actor according to a directory service, and a concatenation layer that combines outputs of blocks of the neural network that include each of the input layers, further wherein instructions to train the neural network comprise instructions executable by the processor to cause the apparatus to train the neural network on third data collected for cloud-based activity of actors including the first actor across a tenant organization of the first actor.

* * * * *